(12) United States Patent
Jacobsen et al.

(10) Patent No.: US 7,002,555 B1
(45) Date of Patent: Feb. 21, 2006

(54) DISPLAY COMPRISING TOUCH PANEL

(75) Inventors: Wolfgang Jacobsen, Köln (DE); Ralf Neigl, Leverkusen (DE)

(73) Assignee: Bayer Innovation GmbH, Düsseldorf (DE)

( * ) Notice: Subject to any disclaimer, the term of this patent is extended or adjusted under 35 U.S.C. 154(b) by 0 days.

(21) Appl. No.: 09/291,832

(22) Filed: Apr. 14, 1999

(30) Foreign Application Priority Data

Dec. 4, 1998 (DE) ................................ 198 56 007

(51) Int. Cl.
*G09G 5/00* (2006.01)
(52) U.S. Cl. ..................... 345/173; 345/102; 349/12; 349/63; 178/18.01
(58) Field of Classification Search ................ 345/173, 345/207, 204, 104, 175, 177, 174, 102; 349/61–72, 349/12; 178/18.01, 18.04, 18.1
See application file for complete search history.

(56) References Cited

U.S. PATENT DOCUMENTS

| | | | |
|---|---|---|---|
| 3,451,741 A | | 6/1969 | Manos ........................ 350/160 |
| 3,832,034 A | * | 8/1974 | Edmonds .................... 350/160 |
| 4,346,376 A | | 8/1982 | Mallos ........................ 340/712 |
| 4,444,998 A | | 4/1984 | House ........................... 178/19 |
| RE32,521 E | * | 10/1987 | Fergason .................... 350/334 |
| 4,699,468 A | * | 10/1987 | Harasin et al. ............. 350/332 |
| 4,847,606 A | * | 7/1989 | Beiswenger ................ 345/175 |
| 4,916,308 A | * | 4/1990 | Meadows ................... 250/221 |
| 4,919,514 A | | 4/1990 | Ebert et al. ............. 350/96.34 |
| 4,997,263 A | * | 3/1991 | Cohen et al. ................. 349/11 |
| 5,117,071 A | * | 5/1992 | Greanias et al. ............. 178/19 |
| 5,179,369 A | | 1/1993 | Person et al. .............. 340/712 |
| 5,317,140 A | * | 5/1994 | Dunthorn .................... 250/221 |
| 5,359,155 A | | 10/1994 | Helser ........................... 178/18 |
| 6,742,907 B1 | * | 6/2004 | Funamoto et al. ............ 362/31 |
| 2001/0043208 A1 | * | 11/2001 | Furness et al. ............. 345/207 |
| 2002/0171637 A1 | * | 11/2002 | Kadowaki et al. .......... 345/204 |

FOREIGN PATENT DOCUMENTS

| | | |
|---|---|---|
| DE | 3223706 | 12/1983 |
| DE | 3306941 | 8/1984 |
| EP | 0 277 744 | 8/1988 |
| EP | 0 458 513 | 11/1991 |

OTHER PUBLICATIONS

Firmenbroschüre Fa. Leukhardt, Systemelektronik, Tuttlingen: LS-IC—Die leistungsstarke Industriecomputer—Familie, (month available) 1998, pp. 1-8.
F.L. Pedrotti, L.S. Pedrotti, Introduction to Optics, pp. 38-40 (date unavailable) 3-5 Refraction Through Plane Surfaces.
Mol. Cryst L'iq. Cryst. (month available) 1984, vol. 109, p. 3, Birendra Bahadur, Liquid Crystal Displays.
J. Fricke, A. Emmerling, Aerogels-Preparation, Properties, Applications, in R. Reisfeld, C.K. Joergensen (Ed). Chemistry Spectroscopy and Application of Sol-Gel Glasses, Springer Verlag (month unavailable) 1992, pp. 37-87.

(Continued)

*Primary Examiner*—Xiao Wu
*Assistant Examiner*—Jean Lesperance
(74) *Attorney, Agent, or Firm*—Norris McLaughlin & Marcus, P.A.; Christa Hildebrand

(57) ABSTRACT

The display device with touch sensor according to the invention consists of an electrochromic cell known per se or a liquid crystal cell, which is located between two transparent plates, a transparent cover plate and a transparent support plate. A radiation source whose light enters the cover plate and illuminates it is arranged on at least one of the end faces of the transparent cover plate. At least one photodetector, in whose photosensitive solid angle range some or all of the cover plate surface lies, is mounted on the support plate is.

25 Claims, 3 Drawing Sheets

OTHER PUBLICATIONS

P. Cielo, Optical Techniques for Industrial Inspection, Academic Press San Diego (month unavailable) 1988, pp. 128-130, Reduction of Electronic Noise.

David A. Glocker, Ismat Shah (Ed.) Handbook of Thin Film Process Technologie, Institute of Physics Publishing, Bristol and Philadelphia (month unavailable) 1995.

* cited by examiner

DISPLAY COMPRISING TOUCH PANEL

The present invention relates to a display device which is combined with a novel touch sensor.

Devices which display information and convert the touching of the display surface or of a subregion of the display surface into an electrical signal are known. They are often referred to as touch screens (see, for example, company brochure from Leukhardt, Systemelektronik, Tuttlingen: LS-IC—Die leistungsstarke Industriecomputer-Familie, 1998).

Touch screens are predominantly used as input devices for computers and electronic measuring and control instruments, in particular in production control and similar fields, in which conventional computer input devices such as a mouse or a keyboard very rapidly wear out because of the strong exposure to dust and dirt. The picture represented on touch screens often consists of a few explanatory texts and a row of fields, the touching of which corresponds to a particular data or command entry.

Known touch screens are, for example, built as liquid crystal displays (LCDs) or cathode ray tubes (CRTs), and an additional touch-sensitive device.

This touch-sensitive device operates, for example, on an optical basis. A light barrier, consisting of a light source and a photodetector, is broken when a finger or another opaque object comes close enough to the tactile surface of the touch screen. This break produces a signal. If touching specific subareas on a screen is intended to produce different signals, then the sensor system will consist of two rows of light barriers which are arranged at right angles to one another along-two-sides of the screen. There is one photodetector opposite each light source (U.S. Pat. No. 5,179,369). A system of this type is complex and therefore expensive to produce and susceptible to faults in continuous operation, since the elements of the light barrier which are arranged in a frame around the tactile surface, namely the light sources and the photodetectors, readily become contaminated.

A further possible way of producing touch-sensitive devices pertains to pressure-sensitive film (U.S. Pat. No. 4,444,998). Pressure-sensitive films consist of at least two layers, an electrically conductive layer and a resistive layer. In the absence of any external influence, these two layers are not in electrical contact with one another. Only when pressure is exerted on the film at a point by touching it is electrical contact made. The resistive layer of this generally rectangular film is provided over the entire length of each of its four edges with a highly conductive contact. Contact is made with the conductive layer only at one point. An electric voltage is applied alternately to the two shorter edges and to the two longer edges of the resistive layer. When, by touching the film at a particular point, contact is made between the conductive layer and the resistive layer, a voltage alternating between two values is produced at the contact with the conductive layer. From these two voltage values, the coordinates of the point of touching can be calculated through a calibration step involving the voltage drop in the resistive film as a function of the distance from the edges with which contact is made. One problem with this type of touch screen is the susceptibility to aging. Because of the continuous mechanical stress during use and because of thermal and radiation-induced stresses, the films become altered. For example, they may become brittle.

The display device with touch sensor according to the invention consists of an electrochromic cell known per se or a liquid crystal cell, which is located between two transparent plates, a transparent cover plate and a transparent support plate. A radiation source whose light enters the cover plate and illuminates it is arranged on at least one of the end faces of the transparent cover plate. At least one photodetector, in whose photosensitive solid angle range some or all of the cover plate surface lies, is mounted on the support plate is.

The light propagates from the radiation source over the irradiated end face of the cover plate by total reflection at the bounding faces of the cover plate (Pedrotti, F. L.; Pedrotti, L. S., Introduction to Optics; p. 38–40). Touching the surface of the cover plate with a finger creates contact areas between the plate and the top skin layer, which consists predominantly of phospholipids. The lipid layer has a refractive index in the region of 1.5 to 1.6. This value is close to the refractive index of a transparent plate, or even higher, so that the majority of the light which was being totally reflected before touching will no longer be totally reflected at the touched location on the plate surface, but will enter the skin and be strongly scattered in it. In the touching zone, a bright spot is formed which is detected by the photodetector on the support plate [lacuna], opposite, of the display device. The extent and the brightness of this spot varies as a function of the touching pressure. With suitably designed evaluation electronics, the sensitivity of the touch sensor can be set to a desired level.

An electrochromic cell which may be used in the device according to the invention is, for example, disclosed by U.S. Pat. No. 3,451,741 consists of two transparent plates, which will be referred to below as the top plate and the bottom plate and are joined together by a ring seal to form a cell. In the cell volume formed in this way there is an electrochromic medium. The top and bottom plates are provided on their sides facing the medium with a transparent electrically conductive coating.

A liquid crystal cell which can be used in the device according to the invention is disclosed by Birenda Bakadur "Liquid Crystal Displays", pub. Gordon and Breach New York and London 1984. The liquid crystal cell consists of two transparent plates, which will be referred to below as the top plate and the bottom plate, between which there is a liquid crystal medium. On their sides which face one another, the plates are provided with a transparent electrically conductive coating and with an orienting layer. The orienting layer is used for aligning the liquid crystals. On their sides remote from one another, the transparent top and bottom plates are provided with a polarization film. If appropriate, in order to correct color defects, it is also possible to interpose a retarder film between the top or bottom plates and the polarization film.

The top plate of the electrochromic cell or of the liquid crystal cell may be identical to the cover plate, and the bottom plate to the support plate.

The display device may be configured as a reflective display without its own light source. In this case, the support plate preferably has a coating on its inside which predominantly reflects visible light, while being predominantly transparent to the light which is emitted by the radiation source on the cover plate. As an alternative, the reflecting coating may preferably have, at the center of the photosensitive solid angle range of the photodetector, a location which is transparent to the light from the radiation source which illuminates the cover plate.

The display device may be configured as a transmissive display with an additional light source for backlighting the display. In this case, the carrier plate preferably has a coating on the inside which is predominantly transparent both to the visible light from the additional light source for backlighting and for the light which is emitted by the radiation source on the cover plate. The two spectral ranges in which the radiation source for the backlighting, on the one hand, and the radiation source on the cover plate, on the other hand, emit are preferably entirely separate from one another in order to avoid mutual interference. The backlighting is carried out by two-dimensional illumination of the electrochromic medium or of the liquid crystals from the side facing the support plate.

The two-dimensional illumination may consist of an optically transparent grid plate, known per se from DE 32 23 706, which is arranged between the bottom plate and the support plate, or is identical to the support plate or the bottom plate of the cell. A light source is arranged on at least one of the end faces of this optically transparent grid plate. The optically transparent grid plate has, on its side remote from the support plate, an optically refractive grid-like surface structure at which the light emerges from the interior of the plate with positional metering. If the surface structures are arranged with a suitably chosen density, the fraction of light locally emerging from the grid plate can be controlled. In this way, it is possible to compensate for nonuniform illumination within the grid plate. Through an increase in the grid density of the surface structure with increasing distance from the light source, it is possible, in particular, to compensate for the attenuation of the light with increasing distance from the light source. The surface structure may, for example, be applied using the screen printing method. In addition, a scattering layer serving as an illumination surface is arranged on or over the structured side.

The display device may, as a combination of a transmissive and a reflective display, also be designed as a semitransparent and semireflecting display with an additional light source. In this case, the support plate has a coating on its inner side which is semireflecting and semitransparent both for the visible light from the additional light source for backlighting and for the ambient light. It is predominantly transparent for the light which is emitted by the radiation source on the cover plate. The display device is equipped with its own two-dimensionally extended light source as a back light for the display. The light source for backlighting can be turned on and off. This display device is easy to read both in almost dark surroundings with backlighting and in bright daylight without backlighting.

The cover plate is preferably at least 0.05 mm, particularly preferably at least 0.5 mm thick. It may consist of any material with low optical attenuation in the spectral range of the radiation source. When assessing the optical attenuation, the length corresponding to the longest dimension of the plate needs to be taken into account. It is preferable to have a material in which the light from the radiation source is attenuated no more than by 50% at a point on the cover plate with maximum distance from the source. Preferred materials include silicate glasses, quartz glasses or transparent polymers such as polycarbonates, polymethacrylates or polyesters.

In order to guarantee good total reflection of the light injected into the cover plate, a material with specially high refractive index is preferably used for the cover plate, particularly preferably glass with a refractive index in excess of 1.6.

Between the cover plate and the top plate of the electrochromic cell or of the liquid crystal cell, there may be a gap which forms an intermediate layer. This intermediate layer is filled with a material having a refractive index which is lower than the refractive index of the cover plate, for example with air or with UV radiation-polymerizable mixtures of polyfunctional (meth)acrylic acid derivatives, monofunctional (meth)acrylates and suitable photoinitiators, as described for example in U.S. Pat. No. 4,919,514 preferred are solid materials produced using a sol-gel process with a porosity of more than 50%, for example based on silicates, aluminates and other binary or ternary systems (J. Fricke, A. Emmerling, Aerogels-Preparation, Properties, Applications in R. Reisfeld, C. K. Joergensen (Ed.) Chemistry, Spectroscopy and Applications of Sol-Gel Glasses, Springer-Verlag 1992 (p. 37–87).

Examples of suitable radiation sources both for the lighting of the cover plate and for the backlighting of the display include tungsten lamps, light-emitting semiconductor diodes or semiconductor lasers. The spectral sensitivity range of the photodetector must cover the emission spectrum of the radiation source. Preferably, the maximum sensitivity of the photodetector and the maximum in the emission spectrum of the radiation source coincide. Semiconductor photodetectors are preferred for the photodetector. Particularly preferred are silicon photodiodes, silicon phototransistors and silicon or silicon/metal oxide charge-coupled devices.

In order to prevent the ambient light from affecting the touch sensor, a radiation source may be used, for lighting the cover plate, whose emission spectrum lies outside the visible spectrum, for example in the infrared spectral range with a wavelength which is more than 680 nm, preferably more than 780 nm and particularly preferably more than 850 nm. The radiation source preferably emits in a spectral range in which the absorption of the display device is low and does not change greatly even if the displayed information is switched over. When an electrochromic cell is being used as the display device, this spectral range is preferably at wavelengths of more than 780 nm.

An additional measure for avoiding errors which, for example, are caused by the ambient light, is to use the lock-in technique (P. Cielo, Optical Techniques for Industrial Inspection, Academic Press San Diego 1988 p. 128–130). The radiation source has its radiation power varied periodically with time at the frequency $f_Q$. Of the electric signals from the photodetector, only that part of the signal is forwarded, in an electronic unit connected downstream, which likewise varies periodically with time and approximately at the same frequency as the radiation power from the radiation source. By choosing the width of the accepted frequency band $\Delta f_p$, for the signal from the photodetector around the frequency $f_Q$, it is possible to optimize the separation of desired signals and noise signals. A relative width of the accepted frequency band $\Delta f_p/f_Q$ of less than 0.1 is preferred, and a relative width $\Delta f_p/f_Q$ of less than 0.01 is particularly preferred.

The solid angle range in which the radiation source radiates should preferably be matched to the illuminated end face of the plate, in order to achieve as complete as possible injection of the light from the radiation source into the plate.

In order to obtain particularly good reflections of the injected light at the end faces of the plate, one or more of the end faces may be coated with an optically reflecting material. That end face which is illuminated by the radiation source is excluded from the coating. Through the reflecting coating of the end faces, the injected light is reflected particularly often inside the plate, which means it is efficiently used and the plate is illuminated more uniformly. Preferred coatings include optically reflecting metals and metal alloys such as gold, silver, copper, nickel, tin or aluminum. Preferred coating methods include physical vacuum coating methods such as vacuum evaporation, sputtering, chemical vapor deposition (CVD) (David A. Glocker, Ismat Shah (Ed.) Handbook of Thin Film Process Technologie, Institute of Physics Publishing, Bristol and Philadelphia 1995). It is also possible to adhesively bond commercially available metal-coated films.

The cover plate may be divided into a plurality of touch fields. Touch fields are regions of the display device which have a uniquely assigned photodetector in whose photosensitive solid angle range only this particular region of the display device lies. When different touch fields are touched, different photodetectors pick up the scattered light produced by the touching. From the signals of the individual photodetectors, it is possible to reconstruct which touch fields have been touched. The distance between two neighboring touch fields should be no smaller than the typical diameter of a human fingertip, about 1 cm, in order to avoid erroneous messages. The touch fields may be recognizably marked for the toucher on the plate, or represented by the display.

The touch sensor may also be switched off fully or for a limited time. This is advantageous in order to avoid malfunctions of the touch sensor when it is touched in a way which does not serve the intended purpose of switching, for example during cleaning. The switching off may be carried out in such a way that, in the event of a particular chronological sequence of touches on the sensor, the associated electric signals from the photodetector or photodetectors in the unit connected downstream for processing the electronic signals initiate switching off. The switching off may mean that no other signals are processed further. The switching off may be for a limited time or may be counteracted by another defined signal sequence.

For example, in one embodiment of the claimed device, which only contains one touch field, the special chronological sequence of the one signal may consist in that the touch field is touched precisely three times in succession within a particular time, for example 5 seconds. In one embodiment of the claimed device, which contains at least two touch fields, the special chronological sequence of signals may for example consist in that two particular touch fields are touched precisely two times in succession, simultaneously and within a particular time, for example 5 seconds. This signal sequence is then further processed by the electronic signal processing device connected downstream in such a way that, for example, no signal corresponding to the touching of a touch field is forwarded for 1 minute.

The display device with touch sensor according to the invention is distinguished by the simplicity of its structure. It contains no moving elements at all. It can be produced with little outlay, has a long life and is quick and easy to clean.

FIGURES AND EXAMPLES

Figure 1:
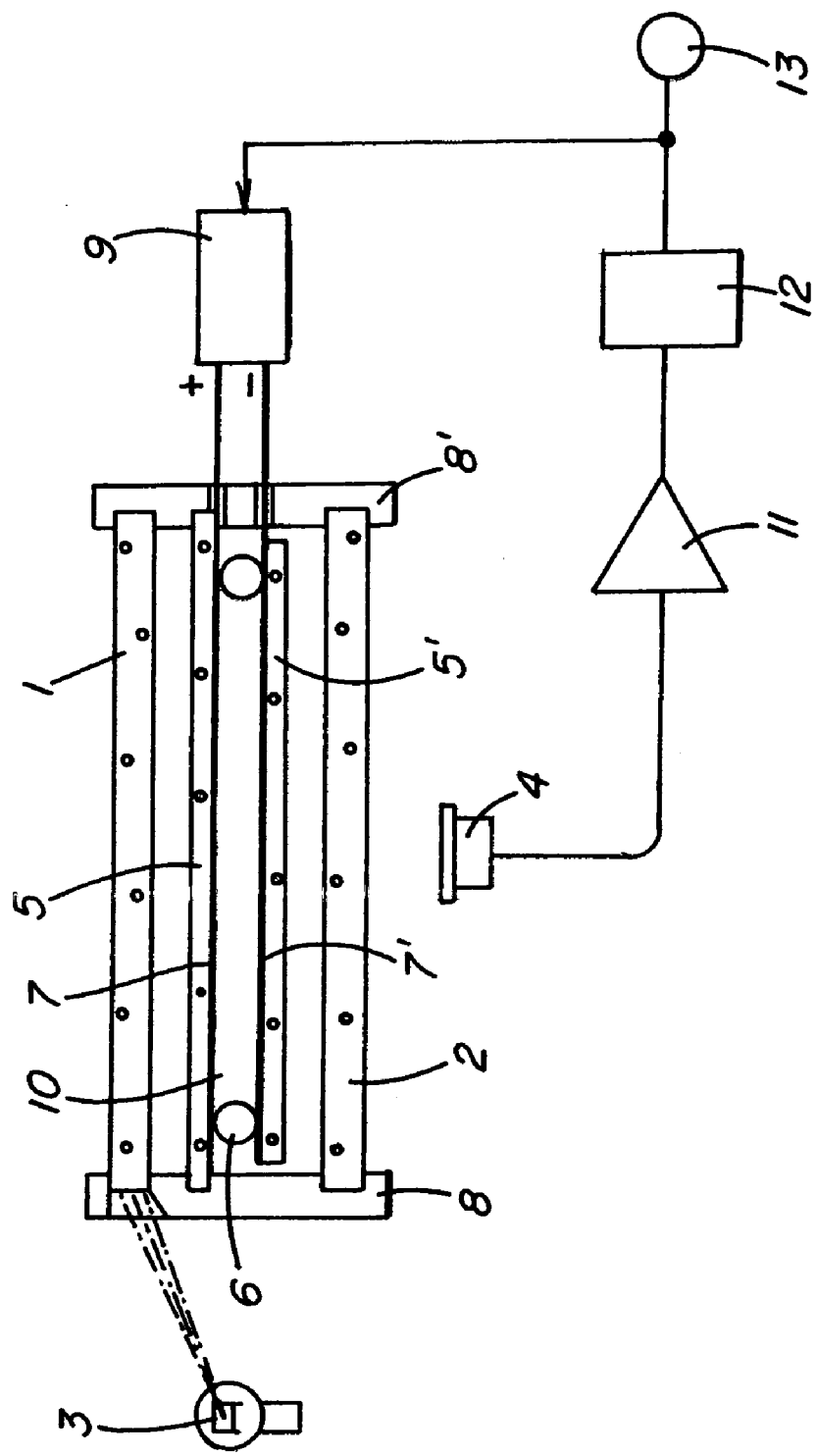
FIG. 1 shows an electrochromic cell as a display device with touch sensor with an separate cover plate and support plate.

The illustrative embodiment in FIG. 1 shows an electrochromic cell as a display device with a touch sensor. The electrochromic cell consists of a transparent top plate 5 and a transparent bottom plate 5' with transparent electrically conductive coatings 7, 7'. The transparent plates 5, 5' are joined together by a ring seal 6 to form a cell. The electrochromic medium 10 is located in the cell volume formed in this way. The electrochromic cell is located between a transparent cover plate 1 and a transparent support plate 2. A radiation source 3, whose light enters the cover plate 1 and illuminates it, is arranged on the end face of the transparent cover plate 1. The centroid wavelength of the light emitted by the radiation source 3 lies between 800 to 1000 nm. A photodetector 4, in whose photosensitive solid angle range the cover plate surface lies, is mounted in the center of the support plate 2. The maximum sensitivity of the photodetector lies between 800 to 1000 nm. The display device as a whole is held together by end plates 8, 8'. For this purpose, the plates 1, 2, 5 and 5' are inserted into the grooves of the end plates 8, 8' and are adhesively bonded.

The transparent electrically conductive coatings 7, 7' are electrically connected to a controllable voltage source 9. As a function of its input signal, the voltage source 9 outputs either the voltage 0 volts or the voltage 0.9 volt, and thereby switches the electrochromic medium over between a transparent state and a state in which it predominantly absorbs visible light. Light from the 800 to 1000 nm wavelength range, as is emitted by the radiation source 3, is conversely absorbed only a little by the electrochromic medium in the two states.

The measurement signal from the photodetector 4 is forwarded to an electronic memory element 12 via a controllable amplifier 11. It is characteristic of this memory element that its output signal can assume only two discrete voltage values. These are denoted by "off" and "on". Each time the output signal from the amplifier 11 exceeds a particular threshold value, the memory element 12 switches its output value over from "off" to "on" or vice versa. If the cover plate 1 is then touched with a finger at about the middle, then the touch zone becomes illuminated in the light from the radiation source 3. Part of this light is registered by the photodetector 4 and amplified in the amplifier 11. If the gain of the amplifier 11 is adjusted suitably, the signal produced in this way is sufficient to switch the memory element 12 over, for example, from "off" to "on". Consequently, the controllable voltage source 9 switches over from the voltage 0 volts to the voltage 0.9 volt and the electrochromic cell becomes dark. By removing the finger and again touching the cover plate, the display device can be switched over again into the "off" state, so that the electrochromic cell becomes transparent again. The electrical output signal from the memory element 12 is also available at the contact 13. It can for example be used in a control or regulating circuit for switching an electrical load on and off.

Figure 2:
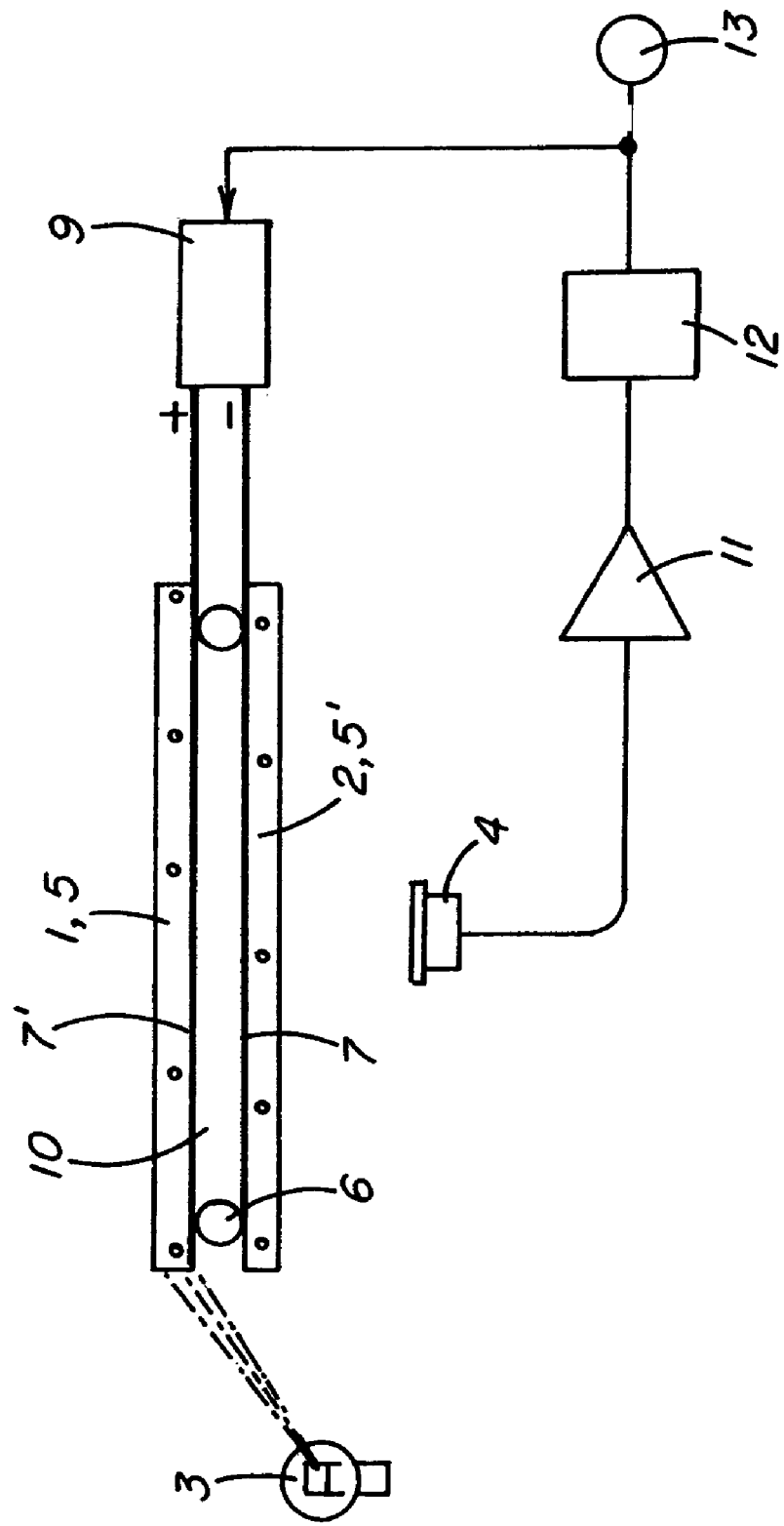
FIG. 2 shows an electrochromic cell as a display device with touch sensor with a integrated cover plate and support plate.

FIG. 2 shows a second illustrative embodiment for a display device with touch sensor. Unlike with the display device represented in FIG. 1, the cover plate 1 is here identical to the top plate 5 of the electrochromic cell, and the support plate 2 to the bottom plate 5' of the electrochromic cell. In this illustrative embodiment, no end plates 8, 8' are needed for holding the device together.

Figure 3:
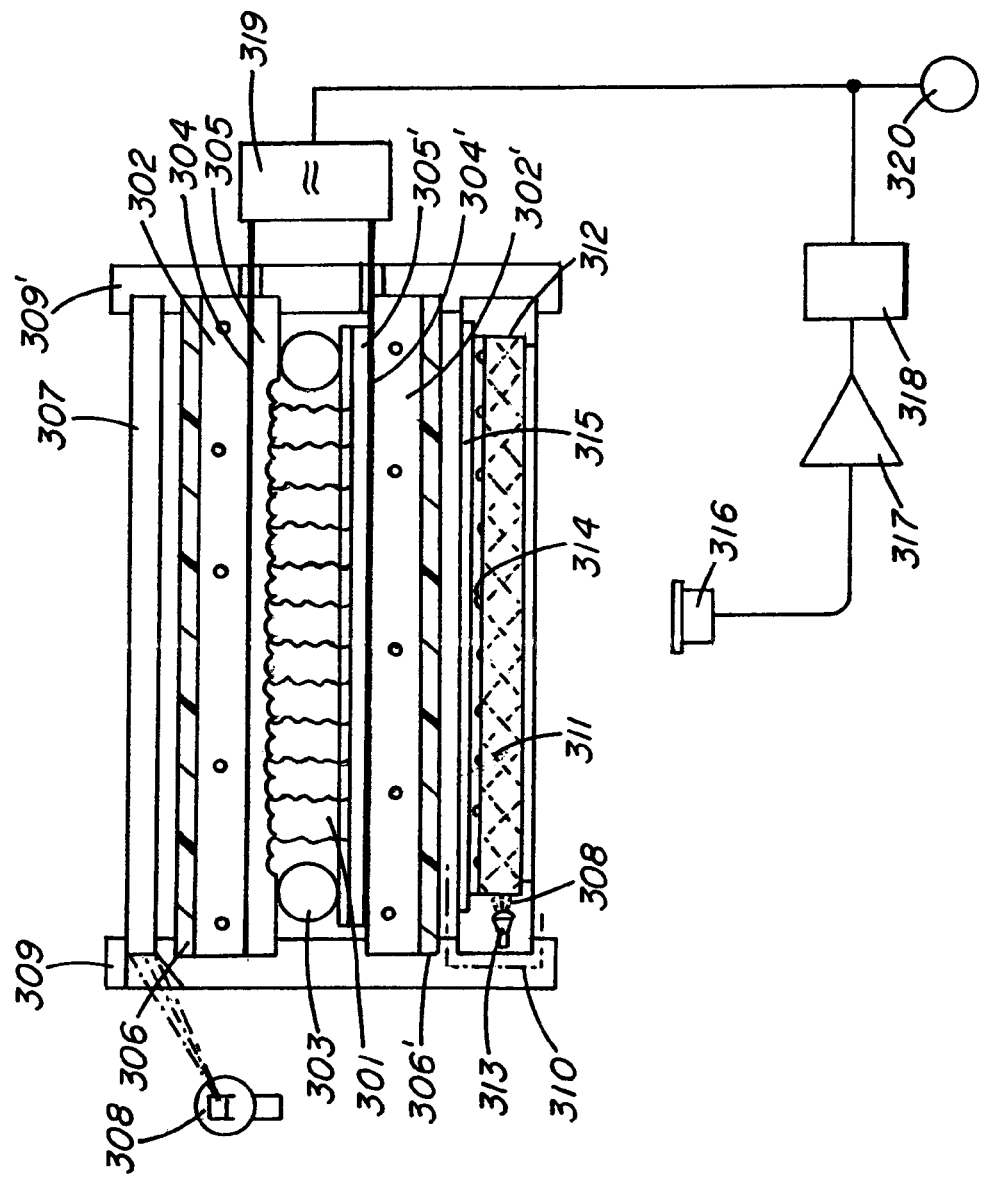
FIG. 3 shows a liquid crystal cell as a transmissive display device with a touch sensor and backlighting.

FIG. 3 represents a further illustrative embodiment for the invention, namely a display device based on a transmissive liquid crystal cell with a touch sensor and backlighting for the cell.

The liquid crystal cell is constructed according to the twisted nematic liquid crystal display principle. The liquid crystal medium 301 is located in a cell which is formed by a transparent top plate 302 and a transparent bottom plate 302' and a ring seal 303. The sides of the plates 302 and 302' facing the liquid crystal medium are provided, on the one hand, with a transparent electrically conductive coating 304 and 304' and, on the other hand, in each case with a so-called orienting layer 305 and 305'. The orienting layers 305 and 305' have microstructuring on the surface, which dictates a favored direction along which the molecules of the liquid crystal medium become preferentially ordered, so long as no additional forces are acting on them. The favored directions of the two orienting layers 305 and 305' are turned through 90° relative to one another. This rotation has the effect that the molecules of the liquid crystal medium become arranged twisted in the cell between the orienting layers.

On the sides of the top plate 302 and of the bottom plate 302' not facing the liquid crystal medium, a polarization film 306 and 306' is adhesively bonded in each case. The dye contained in these films exhibits only very weak absorption in the 800 to 1000 nm wavelength range. The polarization films are therefore virtually transparent to light from this wavelength range irrespective of its polarization direction.

Over the top plate 302, but without direct contact with it, there is a cover plate 307 with a radiation source 308, whose light enters the cover plate 307 and illuminates it, arranged on its end face. The centroid wavelength of the light emitted by this radiation source lies at about 800 to 1000 nm.

The overall unit consisting of the elements 301 to 306 is held together, together with the cover plate 307, by the end plates 309 and 309'. For this purpose, the plates 302, 302' and 307 are inserted into the grooves of the end plates 309 and 309' and are adhesively bonded. The backlighting unit 310, which here replaces the support plate, has likewise been inserted into the grooves intended for this purpose in the end plates 309 and 309' and adhesively bonded as well.

The backlighting unit 310 consists of a transparent grid plate 311 whose three end faces are mirrored with an aluminum foil 312 adhesively bonded on. In the middle of the fourth end face of the grid plate 311, a rod-shaped extended lamp 313 is fitted, whose light enters the grid plate 311 and illuminates it. On the side facing the liquid crystal cell, the transparent grid plate 311 has surface structures 314. These scatter the light from the lamp 313 which is totally reflected in the interior of the grid plate 311 and radiate this light fraction from the grid plate 311 toward the liquid crystal cell. The grid density of the surface structure 314 becomes greater with increasing distance from the light source. The scattering screen 315 fitted between the grid plate 311 and the liquid crystal cell is used for diffuse scattering and therefore uniform distribution of the light. Through the backlighting unit, extraordinarily uniform illumination of the liquid crystal cell is achieved.

Below the backlighting device, a photodetector 316 is mounted approximately at the center of the grid plate 311. The measurement signal from this detector is forwarded via a controllable amplifier 317 to an electronic memory element 318 with a threshold behavior, and on to a controllable AC voltage source 319 with a frequency of 500 hertz. The output signal lines of the AC voltage source 319 are connected to the two conductive coatings 304 and 304' of the plates 302 and 302'. If the memory element 318 forwards the value "off", the output signal of the AC voltage source 319 is equal to 0 volts and the liquid crystal cell is switched to a bright state. If the memory element 318 has the value "on", the rms value of the AC voltage delivered is 3 volts and the cell is dark. The output signal of the memory element 318 is available at the contact 320 for further use, for example in a control or regulating system.

If the cover plate 307 is then touched, for example, with a finger at about the middle, then the touch zone becomes illuminated in the light from the radiation source. Irrespective of the switching state of the liquid crystal cell, the predominant fraction of the part of this light falling within the photosensitive solid angle range of the detector 316 passes through the entire liquid crystal cell and also through the backlighting unit 310 to the photodetector 316. The photodetector signal is amplified in the amplifier 317. If the gain of the amplifier 317 is suitably adjusted, then the signal produced in this way is sufficient to switch the memory element 318 over for example from "off" to "on" [lacuna] The 3 volt AC voltage then applied to the cell switches the cell to a dark state. By removing the finger and again touching the cover plate, the display device can be switched back over into the "off" state.

What is claimed is:

1. A display device with a touch sensor comprising:
   (a) a transparent cover plate,
   (b) a transparent support plate and at least one photodetector that is mounted on the support plate and that has a photosensitive solid angle range so that the support plate lies in the photosensitive solid angle range,
   (c) an electrochromic cell or a liquid crystal cell located between the transparent cover plate and the transparent support plate,
   (d) a radiation source arranged on at least one end face of the transparent cover plate so that light of the radiation source can enter and illuminate the cover plate and the power of the produced radiation varies periodically over time at a particular frequency so that the time-varying electric signal issued by the photodetector is further processed so that only the part of the signal time-varying at approximately the same said frequency is retained.

2. The display device according to claim 1, wherein the cover plate and the support plate are joined together by a ring seal to form a cell, and an electrochromic medium is located in the cell volume, and the plates are provided with a transparent electrically conductive coating on their sides facing the electrochromic medium.

3. The display device according to claim 1, wherein the liquid crystal cell comprises a transparent top plate and a transparent bottom plate that are joined together by a ring seal and between in which the liquid crystals are located, the sides of the plates, which face one another is provided with a transparent electrically conductive coating, and with an orienting layer, and the sides of the plates that are remote from one another is provided with a polarization film.

4. The display device according to one claim 3, wherein the electrochromic medium, or the liquid crystal medium is two-dimensionally illuminated from the side facing the support plate.

5. The display device according to claim 4, wherein (i) the two-dimensional illumination is tied out through an optically transparent grid plate that is arranged between the bottom plate and the support plate, (ii) a light source is arranged on at least one of the end faces of the grid plate and the grid plate having, on the side remote from the support plate, an optically refractive grid like surface structure for positionally metered emergence of light from the interior of the plate, and (iii) a scattering layer serving as an illumination surface is arranged on or over this side.

6. The display device according to claim 5, wherein the grid density of the surface structure of the grid plate becomes greater with increasing distance from the light source.

7. The display device according to claim 5, wherein the grid plate is identical to the support plate or to the bottom plate of the electrochromic cell or of the liquid crystal cell.

8. The display device according to claim 1, wherein the electrochromic cell or the liquid crystal cell has a coating on the bottom plate that predominantly reflects visible light while it is predominantly transparent to the light emitted by the radiation source.

9. The display device according to claim 1, wherein the electrochromic cell or the liquid crystal cell has a coating on the bottom plate that optionally contains a location transparent to the light from the radiation source at the center of the photosensitive solid angle range of the photodetector.

10. The display device according to claim 1, wherein the electrochromic cell or the liquid crystal cell has a semi-transmissive and semi-reflecting coating on the bottom plate.

11. The display device according to claim 1, wherein the cover plate has a thickness of at least 0.05 mm.

12. The display device according to claim 1, wherein the cover plate has a refractive index of at least 1.5.

13. The display device according to claim 1, wherein an intermediate layer is located between the top plate of the electrochromic cell or of the liquid crystal cell and the cover plate.

14. The display device according to claim 13, wherein the intermediate layer has a refractive index that is less than the refractive index of the cover plate.

15. The display device according to claim 13, wherein the intermediate layer comprises air or LTV radiation-polymerizable mixtures of polyfunctional (meth)acrylic acid derivatives, monofunctional (meth)acrylates or suitable photoinitiators, or of solid materials produced using a solgel process and having a porosity of more than 50% based on silicates, aluminates and other binary or ternary systems.

16. The display device according to claim 1, wherein the bottom plate of the electrochromic cell or of the liquid crystal cell is identical to the support plate and/or the top plate is identical to the cover plate.

17. The display device according to claim 1, wherein the radiation source has an emission maximum at a wavelength of more than 680 nm.

18. The display device according to claim 1, wherein the end face illuminated by the radiation source is roughened so as to b weakly scattering.

19. The display device according to one claim 1, wherein at least one and at most three end faces of the cover plate are coated with an optically reflecting material.

20. The display device according to claim 19, wherein the optically reflecting material is gold, silver, copper, nickel or aluminum, and mixtures thereof, and the layers are produced by evaporation coating, sputtering, CVD or adhesive bonding of metal-coated films.

21. The display device according to claim 1, wherein a plurality of photodetectors are fitted on the support plate, a specific region of the cover plate, in which a region is uniquely assigned to the photodetector, lying in the photosensitive solid angle range of each photodetector.

22. The display device according to claim 1, wherein a unit for processing the electrical signal is connected downstream of each photodetector.

23. A method for touch recognition in a display device comprising the steps of
  (a) providing a transparent cover plate lying on a photosensitive solid angle range,
  (b) providing a transparent support plate and at least one photodetector that is mounted on the support plate having a photosensitive solid angle range so that the support plate lies in the photosensitive solid angle range,
  (c) providing an electrochromic cell or a liquid crystal cell located between the transparent parent cover plate and the transparent support plate,
  (d) providing a radiation source arranged on at least one end face of the transparent cover plate so that light of the radiation source can enter and illuminate the cover plate, and
  wherein the power of the produced radiation of the radiation source varies periodically at a particular frequency so that the time-varying electric signal emanated by the photodetector is further processed so as to only retain, the time-varying part of the signal which varies at approximately the same frequency.

24. The method according to claim 23, wherein the relative width of the frequency band accepted during the further processing in the signal from the photodetector around the frequency is less than 0.1.

25. The method according to claim 23, wherein the touch sensor can be switched off fully or for a limited time and, after a predetermined time, switches itself on again or can be switched on again by a specific signal sequence.

* * * * *